(12) United States Patent
Lu et al.

(10) Patent No.: US 6,616,470 B2
(45) Date of Patent: Sep. 9, 2003

(54) PIVOT MECHANISM ARRANGED BETWEEN POWER-RECEIVING MEMBER AND MAIN BODY OF VEHICULAR ELECTRIC APPLIANCE

(75) Inventors: Chang-Kun Lu, Taipei (TW); Chin-Yi Chou, Taipei (TW)

(73) Assignee: Primax Electronics, Ltd. (TW)

( * ) Notice: Subject to any disclaimer, the term of this patent is extended or adjusted under 35 U.S.C. 154(b) by 0 days.

(21) Appl. No.: 10/076,011

(22) Filed: Feb. 12, 2002

(65) Prior Publication Data
US 2003/0053854 A1 Mar. 20, 2003

(30) Foreign Application Priority Data
Sep. 14, 2001 (TW) ........................................ 90122932 A

(51) Int. Cl.[7] ............................................... H01R 13/15
(52) U.S. Cl. ........................................ 439/265; 439/165
(58) Field of Search ................................ 439/265, 669, 439/165; 379/454, 455; 287/215; 455/569; 74/551.3, 551.1

(56) References Cited

U.S. PATENT DOCUMENTS

| | | | | |
|---|---|---|---|---|
| 4,589,860 A | * | 5/1986 | Brandenstein et al. | 474/161 |
| 5,010,792 A | * | 4/1991 | Clarno | 81/58.1 |
| 5,465,634 A | * | 11/1995 | Chen | 74/551.3 |
| 5,860,824 A | * | 1/1999 | Fan | 439/265 |

* cited by examiner

Primary Examiner—Alexander Gilman
(74) Attorney, Agent, or Firm—Madson & Metcalf

(57) ABSTRACT

A pivot mechanism is arranged between a first portion and a second portion of an appliance. The pivot mechanism includes a first ring member, a first humpback bridge, a positioning base and a shaft. The first ring member is disposed on the first portion and having a first engaging element on the peripheral surface thereof. The first humpback bridge is disposed on the second portion and has a second engaging element on the top surface thereof, wherein the first humpback bridge is resilient and flexible. The positioning base is coupled with the second portion and has a first positioning hole. The shaft is penetrated through the first positioning hole and a center of the first ring member for incorporating the positioning base with the first ring member resting on the first humpback bridge, wherein when any of the first and second portions is pivoted about the shaft to have a specific angle therebetween, the first engaging element temporarily deforms the resilient and flexible first humpback bridge and then engages with the second engaging element to fix the specific angle.

16 Claims, 4 Drawing Sheets

PIVOT MECHANISM ARRANGED BETWEEN POWER-RECEIVING MEMBER AND MAIN BODY OF VEHICULAR ELECTRIC APPLIANCE

FIELD OF THE INVENTION

The present invention relates to a pivot mechanism, and more particularly to a pivot mechanism arranged between a power-receiving member and a main body of a vehicular electric appliance.

BACKGROUND OF THE INVENTION

Nowadays, most electric appliances are developed toward miniaturization. Moreover, such electric appliances can be supplied with DC power source of for example 12V voltage via a socket of a cigarette-lighter in an automobile. FIG. 1 is a perspective view illustrating a part of an electric appliance used in an automobile according to prior art. The electric appliance 1 includes a power-receiving member 11 and a main body 12. The rod-shaped power-receiving member 11 is used for receiving a DC power by plugging into the socket of the cigarette lighter. The electric appliance 1, for example, can be a handsfree car kit for cellular phone, a reading lamp, a fan, a loudspeaker, or a liquid crystal display, etc. Between the power-receiving member 11 and the main body 12, the electric appliance 1 further includes a pivot mechanism 13. The pivot mechanism 13 can be utilized to impart multi-stage angles between the power-receiving member 11 and the main body 12 in order to overcome spatial restriction. The pivot mechanism 13 includes a first slab 131 and a second slab 132, which respectively extend from a surface of the main body 12 and one end of the power-receiving member 11. The contact side surfaces of the first slab 131 and the second slab 132 have corresponding male teeth and female teeth for engagement. After a screw 133 is used to fasten the first slab 131 and the second slab 132, the power-receiving unit 11 is positioned on the main body 12 at a specified angle.

It is believed that the pivot mechanism 13 in the prior art has the disadvantages as follows:

(1) the multi-stage angles between the power-receiving member 11 and the main body member 12 are obtained by loosing the screw 133, rotating the power-receiving member 11 to another angle, and finally fastening the screw 133 in such an inconvenient way; and (2) since the power cord (not shown) from the power-receiving member 11 extends into the main body member 12 via the vacant space 134 of the pivot mechanism 13, the power cord is exposed and may lead to an unsafe condition.

SUMMARY OF THE INVENTION

Therefore, the present invention provides an improved pivot mechanism of a vehicular electric appliance, which allows a multi-stage angle adjustment between the power-receiving member and the main body to be performed without unpicking any part of the appliance so as to properly orienting the electric appliance in a convenient manner.

In accordance with an aspect of the present invention, there is provides a pivot mechanism arranged between a first portion and a second portion of an appliance. The pivot mechanism includes a first ring member, a first humpback bridge, a positioning base and a shaft. The first ring member is disposed on the first portion and having a first engaging element on the peripheral surface thereof. The first humpback bridge is disposed on the second portion and having a second engaging element on the top surface thereof, wherein the first humpback bridge is resilient and flexible. The positioning base is coupled with the second portion and having a first positioning hole. The shaft is penetrated through the first positioning hole and a center of the first ring member for incorporating the first ring member with the positioning base with the first ring member resting on the first humpback bridge, wherein when any of the first and second portions is pivoted about the shaft to have a specific angle therebetween, the first engaging element temporarily deforms the resilient and flexible first humpback bridge and then engages with the second engaging element to fix the specific angle.

Preferably, the second portion has a first hollow region beside the first humpback bridge, and the positioning base includes a first projecting plate having the first positioning hole, and passing through the first hollow region.

Preferably, the appliance is an electric appliance, and the positioning base includes an aperture for passing therethrough a power cord of the electric appliance which extends from the first portion into the second portion through the first hollow region. The appliance is one selected from a group consisting of a handsfree car kit for cellular phone, a reading lamp, a fan, a loudspeaker and a liquid crystal display. The first portion is a power plug. The second portion is an electric main body of the appliance.

Preferably, the second portion has a second hollow region opposite to the first hollow region by the first humpback bridge, the positioning base further includes a second projecting plate having a second positioning hole, and passing through the second hollow region, and the shaft sequentially penetrates through the first positioning hole, the first ring member and the second positioning hole.

Preferably, the pivot mechanism further includes a second ring member and a second humpback bridge. The second ring member is disposed on an opposite side of the first portion relative to the first ring member, having a center penetrating therethrough the shaft and having a third engaging element on the peripheral surface thereof. The second humpback bridge is disposed on the second portion in parallel to the first humpback bridge for resting thereon the second ring member, and having a fourth engaging element on the top surface thereof for engaging with the third engaging element, wherein the second humpback bridge is resilient and flexible so as to be temporarily deformed by the third engaging element to allow the first portion pivot relative to each other to have the specific angle.

Preferably, the centers of the first and second ring members are at a level slightly higher than the first and second positioning holes when the first and second ring members rest on the first and second humpback bridges, and the first and second projecting plates pass through the first and second hollow regions, respectively.

Preferably, the pivot mechanism according to claim 8 further includes a first and a second cover pieces coupled with the second portion by two opposite sides of the positioning base, respectively, and combined to cover the first and second ring member, the first and second humpback bridges, the first and second projecting plates, and the shaft.

Preferably, each of the first engaging element and the third engaging element includes a plurality of first teeth, and each of the second engaging element and the fourth engaging element includes a plurality of second teeth having a configuration complying with the first teeth.

In accordance with another aspect of the present invention, there is provided a vehicular electric appliance. The vehicular electric appliance includes a power-receiving member, a main body, a positioning and a shaft. The power-receiving member is used for being incorporated with a DC power source and having on one end thereof a ring member with a first teeth set on the peripheral surface thereof and a passage in a center portion thereof. The main body has a humpback bridge with a second teeth set on the top surface thereof, wherein the humpback bridge is resilient and flexible for supporting the ring member, and the first and second teeth sets have configurations match each other. The positioning base is coupled with the main body and having a positioning hole. The shaft is penetrated through the passage and the positioning hole for incorporating the power-receiving member with the positioning base, and serving as a pivoting axis for a pivoting operation of the power-receiving member relative to the main body, wherein the power-receiving member is pivoted to a position at a specific angle with the main body, and fixed by the engagement of the first t and the second teeth sets.

Preferably, the is selected from a group consisting of a handsfree car kit for cellular phone, a reading lamp, a fan, a loudspeaker and a liquid crystal display.

In accordance with another aspect of the present invention, there is provided an angle-adjustable apparatus for adjusting an angle between a power-receiving member and a main body of a vehicular electric appliance. The angle-adjustable apparatus includes a first curved member, a second curved member and a coupling member. The first curved member is connected to one of the power-receiving member and the main body, and having a first engaging element thereon. The second curved member is connected to the other of the power-receiving member and the main body, made of a resilient and flexible material, and having thereon a second engaging element of a configuration complying with the first engaging element. The coupling member is user for connecting the first curved member with the second curved member by allowing the first engaging element to engage with the second engaging element, and including a shaft penetrating through the first curved member for allowing the first curved member to pivot about the shaft and move relative to the second curved member, thereby adjusting an angle between the power-receiving member and the main body. The first engaging element disengages from the second engaging element in response to an external force, deforms the resilient and flexible second curved member when the external force conducts the movement of the first curved member relative to the second curved member, and then engages with the second engaging element to fix the angle between the power-receiving member and the main body.

Preferably, the first engaging element includes a plurality of first teeth, and the second engaging element includes a plurality of second teeth having a configuration complying with the first teeth.

Preferably, the appliance is one selected from a group consisting of a handsfree car kit for cellular phone, a reading lamp, a fan, a loudspeaker and a liquid crystal display.

Preferably, the resilient and flexible material is plastic.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
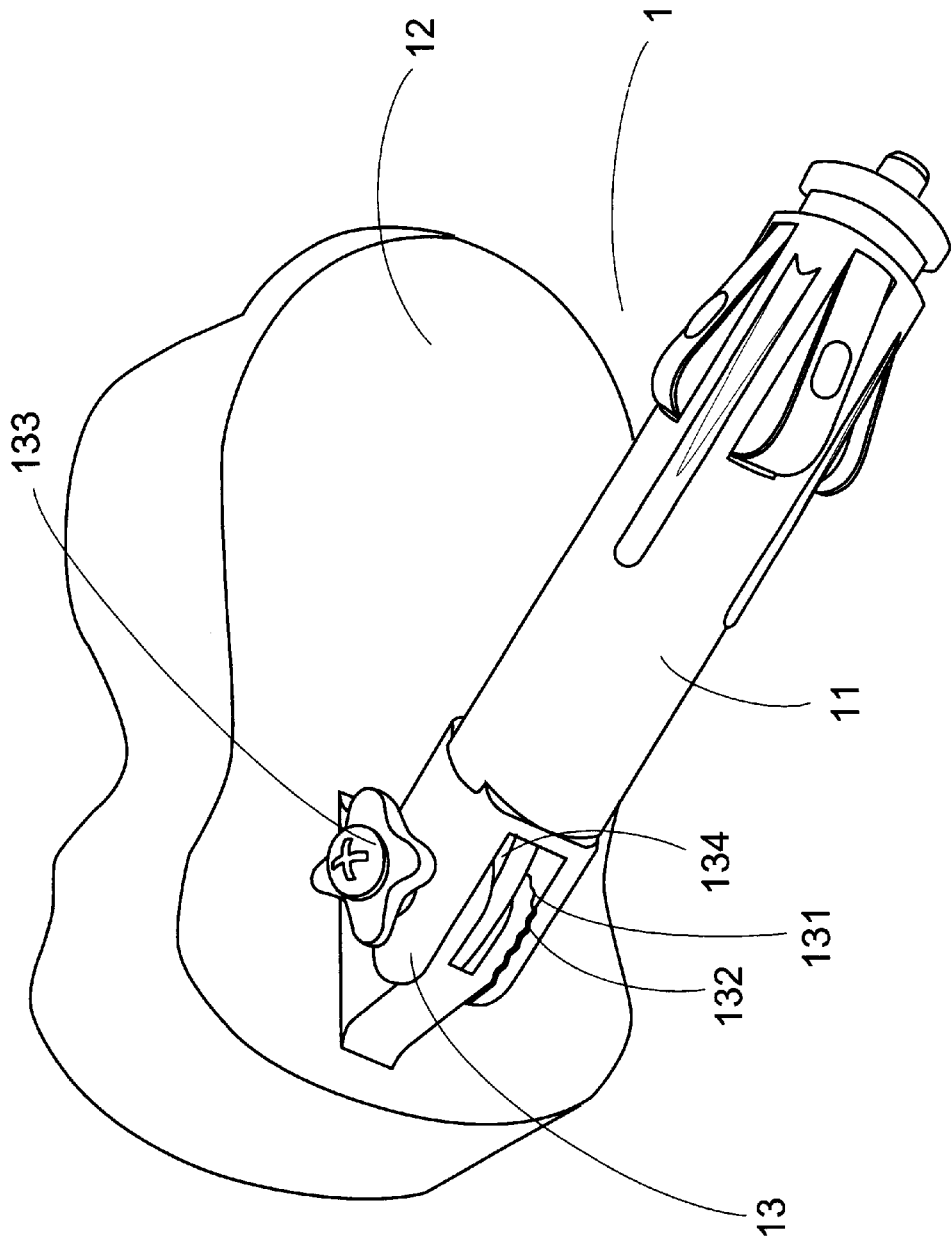
FIG. 1 is a partially perspective view illustrating an electric appliance used in an automobile according to the prior art.
Figure 2:
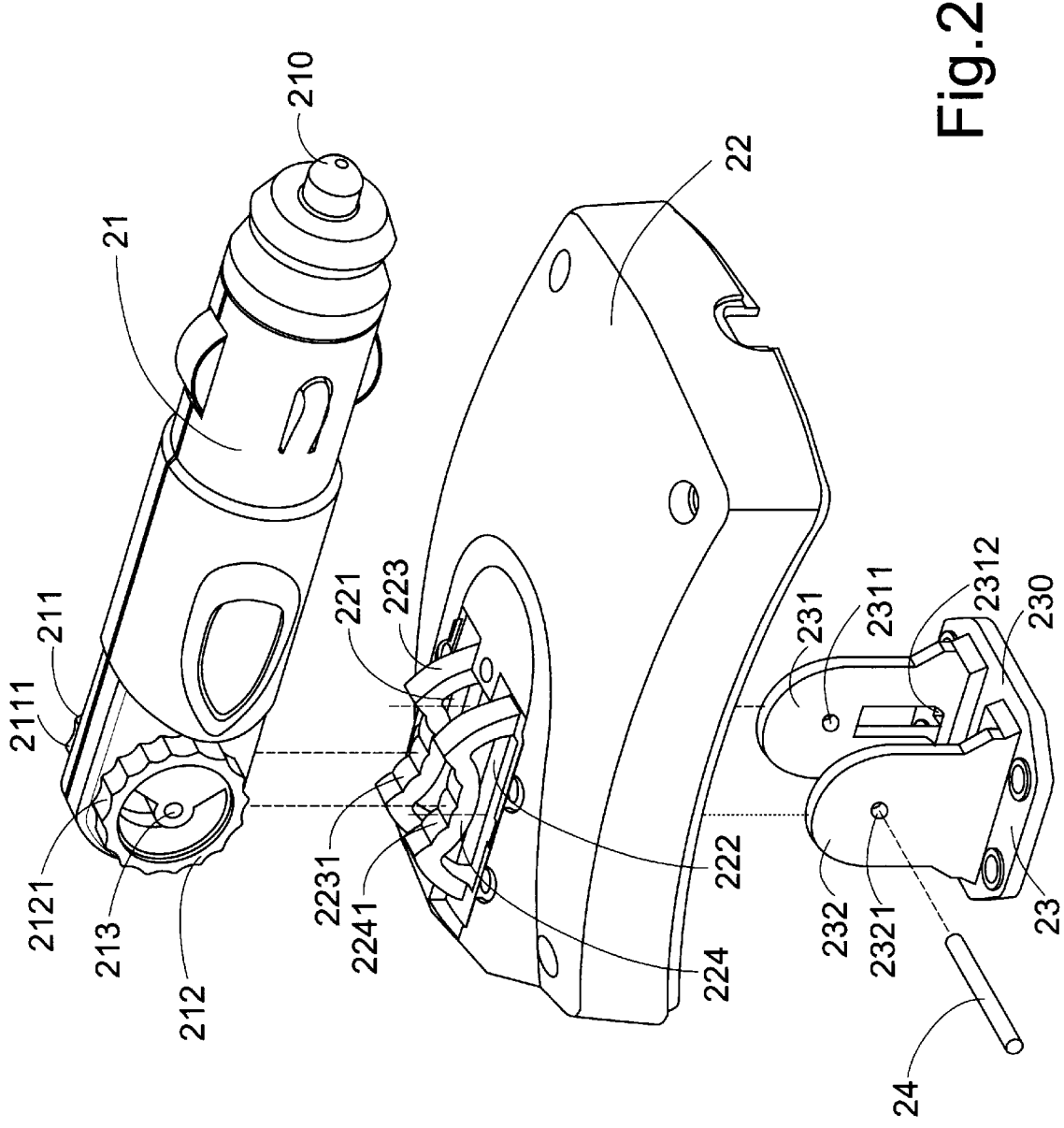
FIG. 2 is an exploded view illustrating the pivot mechanism according to a preferred embodiment of the present invention.

FIG. 2 is an exploded view illustrating the pivot mechanism according to a preferred embodiment of the present invention. The pivot mechanism is arranged between a power-receiving member 21 and a main body 22 of a vehicular electric appliance.

The power-receiving member 21 has on one end a plug 210 to be plugged into the socket of the cigarette lighter for being incorporated with a DC power source. The other end of the power-receiving member 21 includes a first ring member 211 and a second ring member 212. The first ring member 211 and the second ring member 212 have first teeth sets 2111 and 2121 including a plurality of teeth, respectively, on the peripheral surfaces thereof.

The main body 22 has a first hollow region 221, and a second hollow region 222 and includes a first humpback bridge 223 and a second humpback bridge 224. The first hollow region 221 and the second hollow region 222 are located beside the first humpback bridge 223 and the second humpback bridge 224, respectively. In this embodiment, the first humpback bridge 223 and the second humpback bridge 224 are parallel. The top surfaces of the first humpback bridge 223 and the second humpback bridge 224 have second teeth sets 2231 and 2241, respectively. The second teeth sets 2231 and 2241 have configurations complying with the first teeth sets 2111 and 2121. Since the first humpback bridge 223 and the second humpback bridge 224 are made of plastic, they are resilient and flexible.

Referring to FIG. 2, the pivot mechanism of the present invention further includes a positioning base 23 and a shaft 24. The positioning base 23 includes a bottom plate 230, a first projecting plate 231 and a second projecting plates 232. The first projecting plate 231 and the second projecting plates 232 are vertical to the bottom plate 230 and pass through the first hollow region 221 and the second hollow region 222, respectively. In addition, the first projecting plate 231 has a first positioning hole 2311 and an aperture 2312, and the second projecting plates 232 has a second positioning hole 2321. The shaft serves as a pivoting axis for a pivoting operation of the power-receiving member 21 relative to the main body.

The process for assembling the above-mentioned components will be described as follows. Firstly, the positioning base 23 is coupled with the main body 22 by passing the first projecting plate 231 and the second projecting plates 232 upwards through the first hollow region 221 and the second hollow region 222, respectively, and fixing the bottom plate 230 onto the main body 22 via the assembly of screw and nut (not shown). Subsequently, the first ring member 211 and the second ring member 212 are carried on the top surfaces of the first humpback bridge 223 and the second humpback bridge 224, respectively. Then, the shaft 24 penetrates through the second positioning hole 2321, the center 213 of the first ring member 211 and the first positioning hole 2311 for incorporating the ring members 211, 212 with the positioning base 23 with the ring members 211, 212 resting on the humpback bridges 223, 224, respectively.

Figure 3:
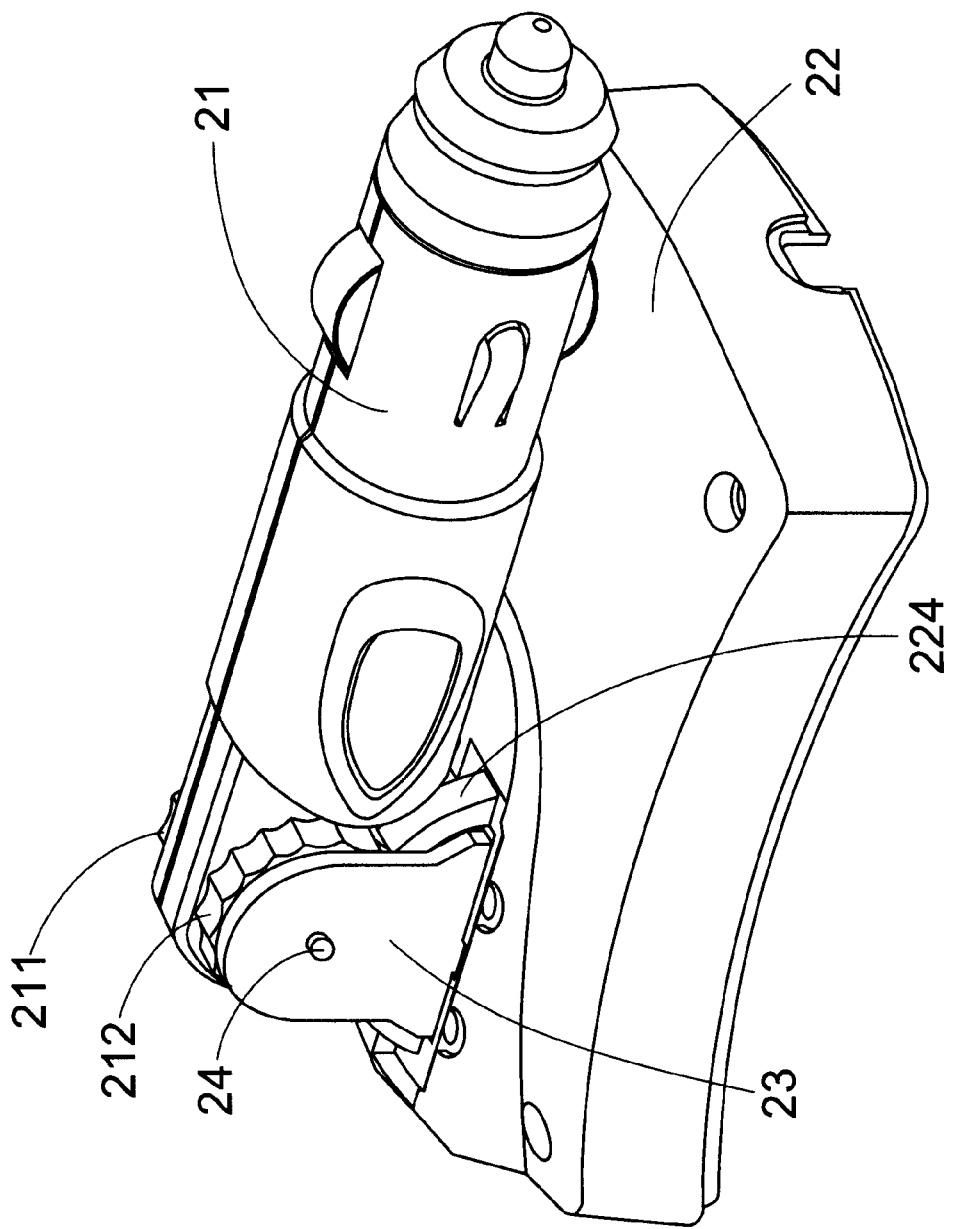
FIG. 3 is perspective view of the pivot mechanism in FIG. 2.

The perspective view of the pivot mechanism in FIG. 2 can be seen in FIG. 3. When any of the power-receiving member 21 and the main body 22 is pivoted about the shaft 24 to have a specific angle therebetween, the first teeth sets 2111, 2121 temporarily deforms the resilient and flexible humpback bridges 223, 224 and then engages with the second teeth sets 2231, 2241 to fix said specific angle. When the ring members 211, 212 rest on the humpback bridges 223, 224, and the projecting plates 231, 232 pass through the hollow regions 221, 222, respectively, the centers of the ring members 211, 212 are at a level slightly higher than the positioning holes 2311, 2321. Thus, after the shaft 24 penetrates through both of the ring centers and the positioning holes, the ring members 211, 212 would be pushed downwards to firmly be in contact with the humpback bridges 223, 224, respectively, via the engagement of the first teeth sets 2111, 2121 and the second teeth sets 2231, 2241. Moreover, the teeth sets 2111, 2121 disengage from said the second teeth sets 2231, 2241 in response to an external force, deforms the resilient and flexible humpback bridges 223, 224 when the external force conducts the movement of the ring members 211, 212 relative to the humpback bridges 223, 224, and then engages with the second teeth sets 2231 to fix the angle between the power-receiving member 21 and the main body 22. When the power-receiving member 21 and the main body 22 are allowed to pivot relative to each other at the specific angle, the operator can feel its stepped movement.

Figure 4:
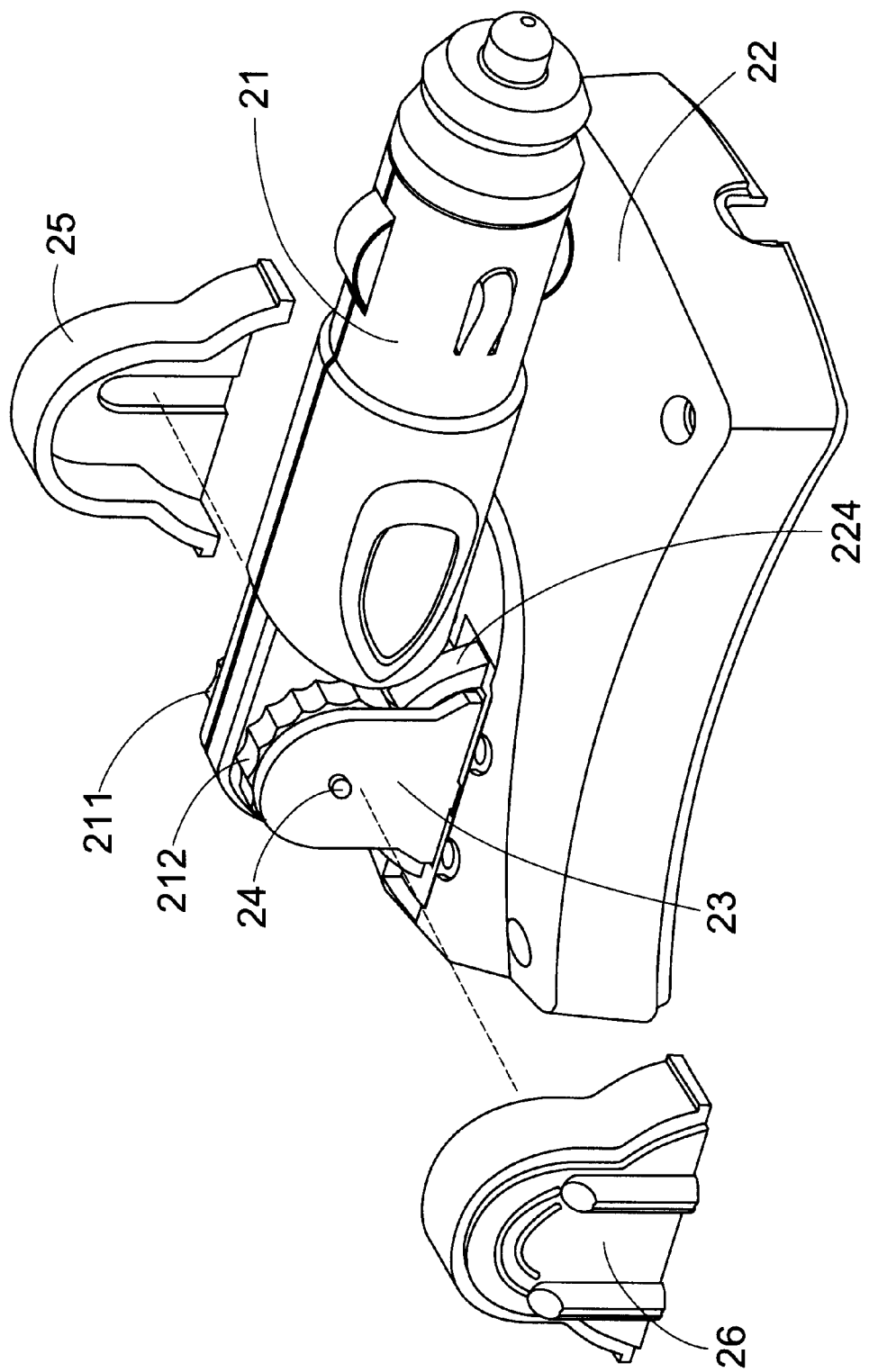
FIG. 4 is a perspective view illustrating the pivot mechanism according to another preferred embodiment of the present invention.

The power cord (not shown) of the power-receiving member 21 electrically connected with the plug 210 will extend from the interior portion of the power-receiving member 21 into the main body 22 through the aperture 2312 and the first hollow region 221. Please refer to FIG. 4. In order to facilitate isolating the power cord, a first piece cover 25 and a second cover piece 26 are coupled with the main body 22 by two opposite sides of the positioning base 23, respectively, and combined to cover the ring members 211, 212, the humpback bridges 223, 224, the projecting plates 231, 232, and the shaft 24.

Although the members 211, 212 are illustrated as a ring shape in the above embodiment, it is understood that the members 211, 212 can also be only parts of the rings, e.g. half circles, as long as the engagement surfaces of the members 211 and 212 are sufficient for the pivoting operation of the power-receiving member 21 or the main body 22. Further, the ring members 211, 212 and the humpback bridges 223, 224 may exchange their mounting situations, i.e. the mounting of the ring members on the main body and the mounting of the humpback bridges on the power-receiving member, to achieve the same purpose with some reasonable modification.

As will be apparent from the above description according to the present invention, the pivot mechanism of the present invention is much more user-friendly than that in the prior art, because the actions of loosing screw and fastening screw could be omitted when changing angles. Moreover, the ring members 211, 212 and the humpback bridges 223, 224 are firmly engaged due to the arrangements that the centers of the ring members 211, 212 are at a level slightly higher than the positioning holes 2311, 2321 after the shaft 24 is positioned, and the humpback bridges are flexible and resilient. Thus, the pivot mechanism of the present invention is suitable for a multi-stage angle adjustment such that the operator can feel its stepped movement. It is believed that the aperture 2312 and the cover pieces 25, 26 can facilitate the isolation of the power cord, which is safer than in the prior art. Therefore, the pivot mechanism of the present invention is suitable for a vehicular electric appliance. The vehicular electric appliance, for example, can be a handsfree car kit for cellular phone, a reading lamp, a fan, a loudspeaker, or a liquid crystal display, etc.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A pivot mechanism arranged between a first portion and a second portion of an electric appliance, comprising:
   a first ring member disposed on said first portion and having a first engaging element on the peripheral surface thereof;
   a first humpback bridge disposed on said second portion and having a second engaging element on the top surface thereof, wherein said first humpback bridge is resilient and flexible;
   a positioning base coupled with said second portion and having a first positioning hole and an aperture, a power cord of said electric appliance passing through said aperture to extend from said first portion into said second portion; and
   a shaft penetrating through said first positioning hole and a center of said first ring member for incorporating said positioning base with said first ring member resting on said first humpback bridge, wherein when any of said first and second portions is pivoted about said shaft to have a specific angle therebetween, said first engaging element temporarily deforms said resilient and flexible first humpback bridge and then engages with said second engaging element to fix said specific angle.

2. The pivot mechanism according to claim 1 wherein said second portion has a first hollow region beside said first humpback bridge, and said positioning base includes a first projecting plate having said first positioning hole, and passing through said first hollow region.

3. The pivot mechanism according to claim 1 wherein said appliance is one selected from a group consisting of a hands free car kit for cellular phone, a reading lamp, a fan, a loudspeaker and a liquid crystal display.

4. The pivot mechanism according to claim 1 wherein said first portion is a power plug.

5. The pivot mechanism according to claim 1 wherein said second portion is an electric main body of said appliance.

6. The pivot mechanism according to claim 1 wherein said second portion has a second hollow region opposite to said first hollow region by said first humpback bridge, said positioning base further includes a second projecting plate having a second positioning hole, and passing through said second hollow region, and said shaft sequentially penetrates through said first positioning hole, said first ring member and said second positioning hole.

7. The pivot mechanism according to claim 6 further comprising:
   a second ring member disposed on an opposite side of said first portion relative to said first ring member, having a center penetrating therethrough said shaft and having a third engaging element on the peripheral surface thereof; and
   a second humpback bridge disposed on said second portion in parallel to said first humpback bridge for resting thereon said second ring member, and having a fourth engaging element on the top surface thereof for engaging with said third engaging element, wherein said second humpback bridge is resilient and flexible so as to be temporarily deformed by said third engaging element to allow said first portion pivot relative to each other to have said specific angle.

8. The pivot mechanism according to claim 7 wherein said centers of said first and second ring members are at a level slightly higher than said first and second positioning holes when said first and second ring members rest on said first and second humpback bridges, and said first and second projecting plates pass through said first and second hollow regions, respectively.

9. The pivot mechanism according to claim 7 further comprising a first and a second cover pieces coupled with said second portion by two opposite sides of said positioning base, respectively, and combined to cover said first and second ring member, said first and second humpback bridges, said first and second projecting plates, and said shaft.

10. The pivot mechanism according to claim 7 wherein each of said first engaging element and said third engaging element includes a plurality of first teeth, and each of said second engaging element and said fourth engaging element includes a plurality of second teeth having a configuration complying with said first teeth.

11. A vehicular electric appliance, comprising:
a power-receiving member for being incorporated with a DC power source and having on one end thereof a ring member with a first teeth set on the peripheral surface thereof and a passage in a center portion thereof;
a main body having a humpback bridge over a surface thereof for supporting said ring member, said humpback bridge having a second teeth set engageable with said first teeth set on a face thereof opposite to said surface of said main body, spaced from said surface of said main body to leave a vacancy therebetween, and being resilient and flexible;
a positioning base coupled with said main body and having a positioning hole; and
a shaft penetrating through said passage and said positioning hole for incorporating said power-receiving member with said positioning base, and serving as a pivoting axis for a pivoting operation of said power-receiving member relative to said main body,
wherein said resilient and flexible humpback bridge is temporarily pushed toward said vacancy to have said second teeth set disengage from said first teeth set by pivoting said power-receiving member, and recovers to have said second teeth set re-engage with said first teeth set when said power-receiving member reaches to a position at a specific angle with said main body.

12. The electric appliance according to claim 11 being selected from a group consisting of a handsfree car kit for cellular phone, a reading lamp, a fan, a loudspeaker and a liquid crystal display.

13. An angle-adjustable apparatus for adjusting an angle between a power-receiving member and a main body of a vehicular electric appliance, comprising:
a first curved member connected to one of said power-receiving member and said main body, and having a first engaging element thereon;
a second curved and hollow member connected to the other of said power-receiving member and said main body, made of a resilient and flexible material, and having a second engaging element of a configuration complying with said first engaging element on a face thereof opposite to the hollow vacancy; and
a coupling member connecting said first curved member with said second curved and hollow member by allowing said first engaging element to engage with said second engaging element, and including a shaft penetrating through said first curved member for allowing said first curved member to pivot about said shaft and move relative to said second curved and hollow member, thereby adjusting an angle between said power-receiving member and said main body;
wherein said first engaging element disengages from said second engaging element in response to an external force, deforms said second curved and hollow member when said external force conducts the movement of said first curved member relative to said second curved and hollow member, and then engages with said second engaging element to fix said angle between said power-receiving member and said main body.

14. The angle-adjustable apparatus according to claim 13 wherein said first engaging element includes a plurality of first teeth, and said second engaging element includes a plurality of second teeth having a configuration complying with said first teeth.

15. The angle-adjustable apparatus according to claim 13 wherein said appliance is one selected from a group consisting of a handsfree car kit for cellular phone, a reading lamp, a fan, a loudspeaker and a liquid crystal display.

16. The angle-adjustable apparatus according to claim 13 wherein said resilient and flexible material is plastic.

* * * * *